S. H. GEER.
ENVELOP SEAL.
APPLICATION FILED JAN. 6, 1912.
1,050,446.
Patented Jan. 14, 1913.
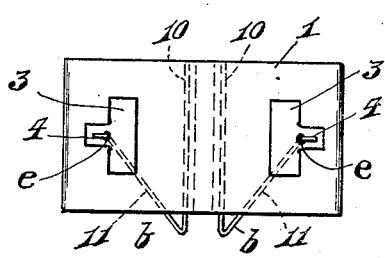
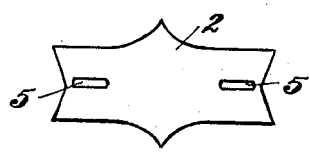
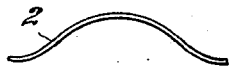
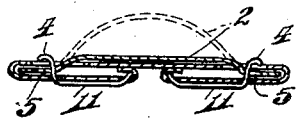
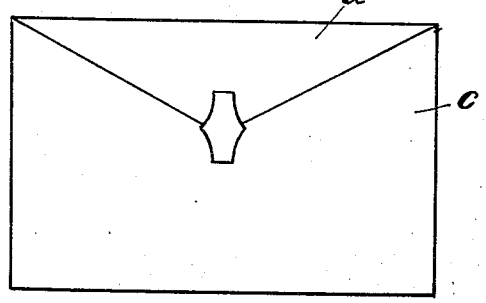
Witnesses:
Seth H. Geer.
Inventor.
By George J. Ottach.
Attorney

UNITED STATES PATENT OFFICE.

SETH H. GEER, OF RACINE, WISCONSIN.

ENVELOP-SEAL.

1,050,446.  Specification of Letters Patent.  Patented Jan. 14, 1913.

Application filed January 6, 1912. Serial No. 669,758.

*To all whom it may concern:*

Be it known that I, SETH H. GEER, a citizen of the United States, residing at Racine, in the county of Racine and State of Wisconsin, have invented certain new and useful Improvements in Envelop-Seals, of which the following is a specification.

This invention relates to fasteners or seals, particularly for sealing envelops against opening by unauthorized persons.

The invention consists, essentially, of two opposing members one of which is adapted to penetrate the back of the envelop to coöperate with the other member disposed within the envelop, and lock the members together in a manner to prevent their surreptitious separation without mutilating the envelop, any tampering with which will, in consequence, be readily apparent.

With the above and other objects in view the present invention consists in the combination and arrangement of parts hereinafter more particularly described, pointed out in the appended claims, and illustrated in the accompanying drawings, it being understood that changes may be made in the form, proportion, size and minor details without departing from the spirit or sacrificing any of the advantages of the invention.

In the drawings: Figure 1 is a plan view of the inner member of the fastener. Fig. 2 is a side view of the same indicating in dotted lines the positions of the spring members of the fastener when engaged by the companion member of the fastener. Fig. 3 is a plan view of the outer or companion member of the fastener. Fig. 4 is an edge view of the latter. Fig. 5 is a longitudinal sectional view through the fastener in assembled position, the dotted lines indicating the position of the outer locking member in the act of assembling the parts. Fig. 6 is a rear view of an envelop showing the invention in plan applied thereto.

Referring now more particularly to the accompanying drawings, the reference character 1 indicates the body portion of the inner plate member of the improved fastener with its ends bent back upon itself in spaced relation to the body portion, as indicated at $a$. The extremities of the bent portions $a$ are bent back upon themselves to form seats in which are secured the shanks 10 of the spring members $b$, each of which latter has an arm 11 which extends upon an incline adjacent the outer face of the bent portions $a$, and upwardly through openings $e$ in the portions $a$, and terminate in hooks 4 disposed normally at the slots 3 in the body portion 1 of the inner plate member. The arms 11 diverge with relation to each other as clearly shown in Fig. 1.

The character 2 indicates the outer plate member of the improved fastener, and is preferably in the form of a normally bowed resilient plate member provided adjacent its ends with slots 5.

In the use of the improved fastener herein described for the purpose of sealing envelops, the inner plate member is disposed within the envelop adjacent the inner of the flaps where the latter fold over one another. The plate member 2 then has one end passed through the back of the envelop $c$ with its opposite end passed through the closure flap $d$. The bowed member 2 is then flattened out with the result that its ends enter the slots 3 of the inner plate member 1 and press against the hooks 4, which causes the spring members $b$ to move slightly until the openings or slots 5 of the bowed member 2 reach the hooks 4, when the latter will snap into the slots 5 of the bowed member 2 and seal the envelop against surreptitious opening, and with the bowed locking member 2 maintained in a flat condition, as illustrated particularly in Fig. 5.

From the foregoing it will be seen that I provide a simple, inexpensive, durable and efficient fastener for envelops or for other purposes, and that when used in connection with envelops that the same cannot be opened without breaking the seal, or without indicating that the envelop has been opened by an unauthorized person.

Having thus described my invention, what is claimed is:—

1. A fastener of the character described comprising a plate having its ends bent back on itself with its bent ends in spaced relation to the body portion of the plate, the body portion of the plate having spaced slots and the extremities of said bent portions being bent backwardly to form seats, spring members having shanks and arms, the shanks being fitted in said seats and the arms diverging with relation to each other, said bent ends having openings through which the extremities of said arms project with the extremities terminating in hooks disposed normally within said slots, and a normally bowed resilient plate whose ends are adapted to pass through the slots of the first mentioned plate member and fit between the body of the latter and its bent portions, the bowed plate having slots into which the hooks of said spring members are adapted to spring to lock said plates together.

2. A fastener of the character described comprising a plate having its ends bent back on itself with its bent ends in spaced relation to the body portion of the plate, the body portion of the plate having spaced slots, spring members seated between the walls of said bent plate and having hooked ends normally projecting into the slots of the plate, and a normally bowed member whose ends are adapted to pass through the slots in the plate and provided with slots at its ends adapted to receive the hooks of the spring members, to lock the members together and to maintain the bowed member in a flat condition.

In testimony whereof I affix my signature in presence of two witnesses.

SETH H. GEER.

Witnesses:
DAVID G. JAMES,
SIGNA BERG.

Copies of this patent may be obtained for five cents each, by addressing the "Commissioner of Patents, Washington, D. C."